United States Patent [19]

Novis et al.

[11] Patent Number: 5,993,950
[45] Date of Patent: Nov. 30, 1999

[54] METAL COATED SUBSTRATES

[75] Inventors: Yvan Novis, Grand-Leez; Jean-Michel Depauw, Brussels, both of Belgium

[73] Assignee: Glaverbel, Brussels, Belgium

[21] Appl. No.: 08/900,707

[22] Filed: Jul. 25, 1997

[30] Foreign Application Priority Data

Jul. 25, 1996 [GB] United Kingdom .................... 9615652
Mar. 4, 1997 [GB] United Kingdom .................... 9704442

[51] Int. Cl.$^6$ ...................................................... B32B 17/06
[52] U.S. Cl. .......................... 428/216; 52/204.5; 359/359; 359/360; 359/580; 359/585; 359/589; 428/34; 428/212; 428/336; 428/469; 428/472; 428/698; 428/701; 428/702
[58] Field of Search .............................. 428/34, 216, 336, 428/426, 432, 434, 469, 457, 472, 698, 701, 702, 212; 52/204.5; 359/359, 360, 580, 585, 589

[56] References Cited

U.S. PATENT DOCUMENTS

| | | |
|---|---|---|
| 4,532,181 | 7/1985 | Brill et al. . |
| 4,894,296 | 1/1990 | Chesworth et al. ..................... 428/432 |
| 4,902,580 | 2/1990 | Gillery . |
| 5,085,926 | 2/1992 | Iida et al. . |
| 5,208,095 | 5/1993 | Nietering . |
| 5,216,551 | 6/1993 | Fuji . |
| 5,264,286 | 11/1993 | Ando et al. .............................. 428/432 |
| 5,271,994 | 12/1993 | Termath ................................. 428/434 |
| 5,510,173 | 4/1996 | Pass et al. ............................... 428/472 |
| 5,563,734 | 10/1996 | Wolfe et al. . |

FOREIGN PATENT DOCUMENTS

| | | |
|---|---|---|
| 0 219 273 | 4/1987 | European Pat. Off. . |
| 0464789 | 1/1992 | European Pat. Off. . |
| 0488048 | 6/1992 | European Pat. Off. . |
| 0593883 | 4/1994 | European Pat. Off. . |
| 0 636 587 B1 | 2/1995 | European Pat. Off. . |
| 0678484 | 10/1995 | European Pat. Off. . |
| 0698585 | 2/1996 | European Pat. Off. . |
| 0 718 250 A2 | 6/1996 | European Pat. Off. . |
| 0747330 | 12/1996 | European Pat. Off. . |
| 2 641 271 | 6/1990 | France . |
| 43 24 576 C1 | 1/1995 | Germany . |
| 2229737 | 10/1990 | United Kingdom . |
| 2229738 | 10/1990 | United Kingdom . |
| 2261079 | 5/1993 | United Kingdom . |
| 2300133 | 10/1996 | United Kingdom . |

*Primary Examiner*—Archene Turner
*Attorney, Agent, or Firm*—Venable; George H. Spencer; Ashley J. Wells

[57] ABSTRACT

A coated substrate including a substrate; a stack of coating layers provided on the substrate composed of, in the sequence recited, (i) a first layer of dielectric material which is a composite layer including a sub-layer comprising a selectively absorbent material having a refractive index of at least 1.4, a spectral absorption index $k_\lambda$ of at least 0.4 in the range $380<\lambda<450$ nm and having a ratio of $k_{380<\lambda<450\ nm}/k_{650<\lambda<760\ nm}>2$, (ii) a first layer of a metal selected the group consisting of silver, gold, copper and alloys of one or more thereof, and (iii) a second layer of dielectric material.

27 Claims, No Drawings

METAL COATED SUBSTRATES

CROSS-REFERENCE TO RELATED APPLICATION

This application claims the priority United Kingdom Patent Appln. No 96 15652.6 of Jul. 25, 1996 and United Kingdom Patent Appln. No 97 04442.4 of Mar. 4, 1997 titled Metal coated substrates, the subject matter of which is incorporated herein by reference.

BACKGROUND OF THE INVENTION

1. Field of the Invention

The present invention relates to metal-coated substrates, and in particular to a metal-coated transparent substrate sheet in which the metal is silver, gold or copper or an alloy of one or more thereof.

Such coated substrates find application as, for example, window glazing for buildings or vehicles, in laminated structures and as optical filters.

Panels used as window glazing in buildings desirably have a low solar factor (FS, defined below) so that the interior of the building is not overheated by solar radiation, while also having an adequate level of luminous transmittance (TL, defined below) so as to provide sufficient internal light. These somewhat conflicting requirements can also be expressed as a need for the panel to display good selectivity, i.e. a high ratio of luminous transmittance to solar factor (further defined below). It is also desirable that the glazing panels present both a neutral aspect in reflection, otherwise expressed as a low colour purity, and a low level of reflection but these are properties which tend to be difficult to achieve in combination with high selectivity.

2. Description of the Related Art

It is known to improve the selectivity of a metallic coating on glazing by increasing the thickness of the metallic layer(s). However this has the disadvantage of imparting to the glazing a purple colour in reflection, which tends to be regarded as aesthetically unattractive. It has therefore been proposed to overcome the disadvantage by use of an oxide layer beneath the metal, the said oxide layer having a higher refractive index than other oxide layers in the coating, whereby interference effects are created between the respective oxide layers which reduce the undesired coloration. French patent specification 2719036 teaches the use as such an underlayer of an oxide selected from niobium oxide and tantalum oxide. Such a high refractive index underlayer does not however favour the achievement of a low luminous reflectance (RL), and consequently of a high selectivity, of the coated substrate. Our earlier GB patent specifications 2229737 and 2229738 describe a substrate of a glazing material carrying a multi-layer coating which comprises a reflective layer of silver sandwiched between a transparent undercoat and a transparent overcoat. The undercoat comprises at least one layer of a metal oxide over which is deposited a layer of zinc oxide up to 15 nm thick. The overcoat comprises a layer of an oxide of a sacrificial metal such as aluminium, bismuth, stainless steel, tin or titanium or of a mixture thereof.

SUMMARY OF THE INVENTION

The present invention has the objective of providing an improved coating stack in which both the purple colour in reflection is neutralised and a low level of reflection is achieved, without resulting disadvantages in the stack's selectivity.

Several of the properties of a coated substrate have precise meanings defined by an appropriate standard. Those used herein include the following, based on the definitions of the International Commission on Illumination— Commission Internationale de l'Eclairage ("CIE").

The standard illuminant quoted herein is Illuminant C, as defined by CIE. Illuminant C represents average daylight having a colour temperature of 6700° K.

The "luminous transmittance" (TL) is the luminous flux transmitted through a substrate as a percentage of the incident luminous flux (of Illuminant C).

The "luminous reflectance" (RL) is the luminous flux reflected from a substrate as a percentage of the incident luminous flux of Illuminant C.

The "spectral absorption index" ($k_\lambda$) of a substrate is defined by the formula:

$$(k_\lambda) = \frac{\lambda}{4\pi} a(\lambda)$$

where $a(\lambda)$ is the spectral linear absorption coefficient.

The "solar factor" (FS) is the ratio of the sum of the total energy directly transmitted through a substrate and the energy which is absorbed and re-radiated on the side away from the energy source as a proportion of the total radiant energy incident on the substrate.

The "selectivity" (SE) of the coated substrate is the ratio of the luminous transmittance (TL) to the solar factor (FS).

The "purity" (p) of the colour of the substrate refers to the excitation purity measured with Illuminant C as defined in the CIE International Lighting Vocabulary, 1987, pages 87 and 89. The purity is specified according to a linear scale on which a defined white light source has a purity of zero and the pure colour has a purity of 100%. The purity of the coated substrate is measured from the side opposite the side with the coating.

The term "refractive index" (n) is defined in the CIE International Lighting Vocabulary, 1987, page 138.

The "dominant wavelength" ($\lambda_D$), also known as the "tint", is the peak wavelength in the range transmitted or reflected by the coated substrate.

According to the present invention there is provided a coated substrate carrying a stack of coating layers comprising, in sequence from the substrate, (i) a layer of dielectric material, (ii) a layer of a metal selected from silver, gold, copper and alloys of one or more thereof, and (iii) a further layer of dielectric material, characterised in that the layer (i) of dielectric material is a composite layer which includes a sub-layer of a selectively absorbent material with a refractive index of at least 1.4, a spectral absorption index $k_\lambda$ of at least 0.4 in the range 380<$\lambda$<450 nm and presenting a ratio $k_{380<\lambda<450\ nm}/k_{650<\lambda<760\ nm}>2$.

The coated substrates of the invention are thus characterised by a sub-layer formed of material(s) with particular absorbent properties which differ from those of the sub-layer of our earlier applications. Absorption of the blue component of the undesirable purple colour due to the thickness of the metallic layer(s), which by reference to the ratio k (for 380<$\lambda$<450 nm)/k (for 650<$\lambda$<760 nm) should be >2, is satisfied by the material(s) which form the sub-layer. The quoted wavelength ranges are within the visible spectrum.

The invention thus employs two colour-neutralising mechanisms: absorption in the blue part of the spectrum (wavelengths in the range of about 450 nm and below) and interference effects displayed by the collective layers of the stack in the red part of the spectrum (wavelengths in the range of about 650 nm and above); and are thus more effective than previous proposals in reducing the purple coloration. Moreover, contrary to previous proposals which relied simply on interference effects, the invention does not require the use of a neutralising layer with a refractive index higher than that of other oxide or nitride layers. The coating stack also displays an improved, i.e. reduced, purity of reflection, and remarkably this is achieved in combination with a very low level of luminous reflectance (RL).

The coated substrates of the invention, and thus glazing panels including them, have the high selectivity associated with the presence of large thicknesses of metallic layers but without the significant reflection and strong purple coloration generally inherent in such products. In comparison with a similarly coated substrate containing one or more thick metallic layers but without the absorbent material, the panels according to the invention offer a selectivity at least as good, a higher dominant wavelength in reflection ($\lambda$D)—tending towards green—but simultaneously with a weaker reflection from the glass side (RL) and a lower colour purity in reflection (p).

In further embodiments of the invention the coating stack may include a further metal layer (iv) and a further dielectric layer (v).

A sacrificial barrier layer, for example of a metal selected from chromium, chromium/nickel alloy, niobium, tantalum, tin, titanium and zinc, is desirably provided immediately above the or each metallic layer. The preferred sacrificial metal is titanium. The sacrificial metal takes up oxygen that would otherwise attack the metallic layer during and after the formation of the coating and the resultant oxide provides a protective layer on the metallic layer. From the viewpoint of the sacrificial duty the sacrificial metal preferably has a thickness of 2 to 5 nm, but the use of a thickness of up to 10 nm may be beneficial in leaving an unoxidised layer of the sacrificial metal to enhance the anti-solar properties of the coating as a whole.

The dielectric materials of layers (i), (iii) and (v) preferably comprise at least one metal oxide or metal nitride. Suitable examples of these include alumina ($Al_2O_3$), aluminium oxynitride, magnesia (MgO), niobium oxide, ($Nb_2O_5$), silica ($SiO_2$), silicon nitride ($Si_3N_4$), tantalum oxide ($TaO_2$), tin oxide ($SnO_2$), titanium dioxide ($TiO_2$), yttrium oxide ($Y_2O_3$), zinc oxide (ZnO), and zinc sulphide (ZnS). These may be used alone or in combination. They are non-absorbent transparent materials capable of adjusting the luminous reflectance RL and the colour purity p. The required optical interference effects whereby the stack reduces the purple reflection are conveniently achieved by multiple sub-layers of the said materials, for example $SnO_2$/ZnO or $ZnO/SnO_2/ZnO$.

In a stack having a single metal layer the thicknesses of the dielectric layers (i) and (iii) are preferably in the ranges 15–45 nm and 30–60 nm respectively, most preferably 25–45 nm and 35–55 nm. In a stack having two metal layers the thicknesses of the dielectric layers (i), (iii) and (v) are preferably in the ranges 15–35 nm, 60–90 nm and 20–40 nm respectively.

The selectivity of a coated substrate including the sub-layer has been found to be at least as high as an equivalent coated substrate from which the sub-layer product is absent.

Suitable examples of the selectively absorbent material for the said sublayer are stainless steel oxide (SSOx), ferric oxide ($Fe_2O_3$), a chromium oxide ($CrO_x$:CrO or $Cr_2O_3$), palladium oxide (PdO), germanium, a germanium oxide ($GeO_x$, where $0<x<1$), silicon and a silicon oxide ($SiO_x$, where $0<x<1$), of which stainless steel oxide and ferric oxide are preferred. Ferric oxide has an advantage over stainless steel oxide in terms of colour neutralisation but this is to some extent reversed because stainless steel oxide is not magnetic and thus is easier to deposit than ferric oxide, whose diamagnetism hinders its application by magnetron cathode sputtering.

It is to be noted that these selectively absorbent materials also have good absorbent properties for ultra violet (UV) wavelengths. Thus a glazing panel with a coating stack including such a selectively absorbent material offers the further advantage of reducing the amount of UV-radiation entering a room and thereby protects from discoloration any textiles and plastics in the room.

Although the layers (iii) or (v) can similarly include a sub-layer of a selectively absorbent material the required degree of absorbency is in many cases adequately obtained by the sub-layer in the first layer (i) alone.

The thickness of the or each selectively absorbent sub-layer should preferably be less than 15 nm. Coated substrates according to the invention in which the thickness of the said sub-layer is less than 5 nm are of especial interest. A 5 nm thickness of SSOx permits the colour neutralisation of a 14 nm silver layer and the same thickness of $Fe_2O_3$ permits the neutralisation of a 17.5 nm silver layer.

The metal layers (ii) and (iv) are formed of silver, gold or copper or an alloy of one or more thereof. In one embodiment of the invention with a single metal layer (ii) present in the stack the metal thickness is preferably in the range 10 to 20 nm, being associated with a luminous reflectance (RL) of less than 20%. In another embodiment of the invention with a single metal layer (ii) present in the stack its thickness is preferably in the range of more than 20 nm up to 30 nm, being associated with a luminous reflectance (RL) of less than 40%.

When two such layers (ii) and (iv) are present their thicknesses are preferably each in the range 10 to 25 nm.

The use of an absorbent sub-layer in the first dielectric layer (i) favours the achievement of a lower luminous reflectance (RL) value for the coated substrate than for a traditional "neutralising" stack having metal layers of the same thickness(es) as those of the said coated substrate. In the case of a coating stack according to the invention with two metal layers (ii) and (iv) the RL value is preferably less than 15%.

The substrate is most typically glass but can be another transparent material such as polycarbonate, polymethyl methacrylate or polyethylene terephthalate.

The coated substrate preferably has a colour purity (p) of less than 20%, more preferably less than 10%. This advantageously low colour purity is remarkable in being associated with the low RL values also achievable by the present invention.

Moreover, in addition to such a considerable reduction in the purity of the coated substrate, the invention also increases its dominant wavelength ($\lambda$D), preferably to a dominant wavelength between 480 and 500 nm. In this wavelength range the tint is no longer purple but rather tending to blue to blue/green.

The thickness dimensions quoted herein for the layers and sub-layers of the coating stack are geometric thicknesses. The quoted properties of the coated substrate are measured on the basis of a single sheet of ordinary clear soda-lime glass having a thickness, unless otherwise specified, of 6 mm. The properties are as observed from the face opposite to the coated face, i.e. from the glass side. The opposite face is usually uncoated.

As used in a glazing panel the coated substrate is conveniently included with one or more uncoated substrate sheets in a multiple glazing assembly, with the coating being located on an internal face.

According to the invention it has become possible readily to achieve double glazing with levels of selectivity which hitherto were achieved with great difficulty. The invention provides for a selectivity of greater than 1.4 when employing a single metal layer in a coating stack and greater than 2.0 when employing a double metal layer in a coating stack. Moreover these high levels of selectivity are obtained in combination with low colour purity and low reflectivity.

While primarily described herein with reference to coated substrates used in glazing panels the invention is also applicable to coated substrates employed in optical filters. Typical examples of such filters are monochromatic filters which serve to reduce the bandwidth of visible radiation passing through them. Also known as "quarter wavelength" or Fabry-Perot filters they are typically centred on the wavelength range of maximum human visual acuity (550 nm±50 nm). In particular they can serve to eliminate those parts of the spectrum which do not contribute to luminous transmittance but are prejudicial to the solar factor, i.e. the infra-red and ultra-violet parts of the spectrum. They accordingly offer the possibility of obtaining higher selectivity values but this advantage is usually paid for by an undesired increase in colour purity in reflection. The introduction of an absorbent sub-layer according to the invention allows this disadvantage to be overcome. The coated substrates for these filters are of the same structure as the double-metallic-layer coated substrates described above but have different thicknesses of dielectrics, namely:

(i) and (v): less than 10 nm (excluding the selective absorbent sub-layer, which should be less than 15 nm)

(iii): (550 nm/4n)±15% [where n represents the refractive index of the dielectric layer (iii)].

The coating layers are preferably applied by vacuum deposition. This method is preferred because it provides for coatings of readily controlled thickness and composition and thus assists in achieving the uniformity of product required by the invention. The deposition typically employs one or more vacuum deposition chambers, conveyors for the substrate, power sources and gas entry locks. Each deposition chamber contains planar magnetron sputtering cathodes, gas inlets and an evacuation outlet, deposition being achieved by passing the substrate several times under the cathodes. The pressure in the chambers is typically about 0.3 Pa.

The relatively low thicknesses of the respective layers of the coated substrate of the present invention provide operational advantages both in terms of the short time taken to apply the layers and in the economical use of the respective materials.

DESCRIPTION OF THE PREFERRED EMBODIMENTS

EXAMPLES

The invention is described in more detail with reference to the following non-limiting examples. For every example according to the invention there is at least one comparative example so as to demonstrate the improvements achieved by coated substrates according to the invention.

For each of the examples a substrate sheet of 6 mm clear glass was passed through a vacuum deposition apparatus including chambers having cathodes provided with targets formed, according to the particular stack, of titanium, stainless steel, iron, zinc and tin employed for respectively the deposition in an oxygen atmosphere of dielectric sub-layers of titanium dioxide ($TiO_2$), stainless steel oxide (SSOx), ferric oxide ($Fe_2O_3$), zinc oxide (ZnO) and stannic oxide ($SnO_2$) [(i), (iii) and, in some instances (v)]. Targets of silver and titanium were similarly used for the deposition in an argon atmosphere of one or more layers of silver [(ii) and in some instances (iv)] and titanium as one or more sacrificial barrier layers.

The substrate sheet was subjected to return passages through the deposition apparatus so as to obtain the required layers and thicknesses of two or three layers of dielectric materials. The completed coating stacks included layers as shown in the accompanying Table 1. Their optical properties were examined from the glass side and the results are shown in Table 2. The TL, FS and SE results in the last three columns were obtained for a double glazing assembly incorporating a sheet coated as above. The intermediate space between the sheets of the assembly was filled with argon.

When in these examples the dielectrics contained sub-layers of the structure $SnO_2$/ZnO, these oxides were present in the same proportions (0.5/0.5). When the structures were of the type ZnO/$SnO_2$/ZnO, the proportions were 0.25/0.5/0.25.

In all the examples the absorption coefficient in the blue range (380<λ<450 nm) was between 0.4 and 1.2 for the SSOx and between 0.5 and 0.9 for the $Fe_2O_3$.

Example 1 (comparative) illustrates the use of a high refractive index material ($TiO_2$, which has a refractive index of 2.5 compared with about 2.0 for ZnO or $SnO_2$) in the dielectric 1. Such a material limits the colour purity of the purple colour caused by the important layer of silver used with reference to the use of a lower refractive index material. This corresponds to the prior art techniques. Example 2 (comparative) shows that even in the case of such a technique, the reflection is reduced, the colour purity is further reduced and the length of the dominant wavelength increased by the introduction of the first dielectric of an absorbent sub-layer according to the invention.

Example 3 illustrates that the thicker is the absorbent sub-layer, the lower is the stack's luminous reflectance and colour purity in reflection, and the higher is its dominant wavelength.

Example 10 illustrates an application of the invention in the field of optical filters. This example is also an illustration of the superior neutralising power of $Fe_2O_3$ compared with SSOx.

TABLE 1

(thicknesses in nm)

| Example | Dielectric 1 (i) | | | Metal (ii) | Barrier 1 | Dielectric 2 (iii) | Metal (iv) | Barrier 2 | Dielectric 3 (v) |
|---|---|---|---|---|---|---|---|---|---|
|  | TiO$_2$ | Fe$_2$O$_3$ | TiO$_2$ | Ag | Ti | TiO$_2$ | Ag | Ti | ZnO/SnO$_2$/ZnO |
| 1 | 21 | — | — | 20 | 3 | 38.5 | — | — | — |
| 2 | 16 | 8 | 5 | 20 | 3 | 37 | — | — | — |
|  | SnO$_2$/ZnO | SSOx | ZnO | " | " | ZnO/SnO$_2$/ZnO | " | " | " |
| 3a | 34 | — | — | 13.5 | 3 | 42 | — | — | — |
| 3b | 18 | 10 | 5 | 13.5 | 3 | 42 | — | — | — |
| 3c | 13 | 13 | 5 | 13.5 | 3 | 42 | — | — | — |
| 4a | 26 | — | — | 18 | 3 | 47 | — | — | — |
| 4b | 15 | 6 | 5 | 18 | 3 | 47 | — | — | — |
| 5a | 30 | — | — | 22.5 | 3 | 52 | — | — | — |
| 5b | 20 | 4 | 6 | 22.5 | 3 | 52 | — | — | — |
| 6a | 40 | — | — | 27 | 3 | 54 | — | — | — |
| 6b | 30 | 4 | 6 | 27 | 3 | 54 | — | — | — |
|  | SnO$_2$ | " | SnO$_2$/ZnO | " | " | " | " | " | " |
| 7a | — | — | 28 | 14.5 | 3 | 73 | 14.5 | 3 | 28 |
| 7b | — | 3 | 25 | 14.5 | 3 | 73 | 14.5 | 3 | 28 |
| 8a | — | — | 32 | 16 | 3 | 80 | 16 | 3 | 32 |
| 8b | — | 7 | 25 | 16 | 3 | 80 | 16 | 3 | 32 |
| 9/1a | — | — | 31 | 18 | 3 | 81 | 18 | 3 | 31 |
| 9/1b | — | 8 | 23 | 18 | 3 | 81 | 18 | 3 | 31 |
| 9/2a | — | — | 22 | 11 | 3 | 80 | 21.5 | 3 | 33 |
| 9/2b | — | 9 | 13 | 11 | 3 | 80 | 21.5 | 3 | 33 |
| 9/3a | — | — | 22 | 14.5 | 3 | 80 | 18 | 3 | 33 |
| 9/3b | — | 14 | 8 | 14.5 | 3 | 80 | 18 | 3 | 33 |
| 10a | — | — | 5 | 11.5 | 3 | 61 | 10.5 | 3 | 5 |
|  | " | Fe$_2$O$_3$ | " | " | " | " | " | " | " |
| 10b | 5 | 15 | — | 11.5 | 3 | 61 | 10.5 | 3 | 5 |

TABLE 2

| Example | TL (%) | RL (%) | $\lambda_D$ (nm) | p (%) | TL (%) | FS (%) | SE |
|---|---|---|---|---|---|---|---|
| 1 | 71.1 | 21.7 | 478 | 21.0 | 64 | 41 | 1.56 |
| 2 | 75.1 | 11.6 | 480 | 10.0 | 68 | 41 | 1.56 |
| 3a | 84.5 | 8.2 | 472 | 23.0 | 76 | 52 | 1.46 |
| 3b | 80.9 | 6.7 | 480 | 13.5 | 73 | 49 | 1.49 |
| 3c | 78.9 | 5.8 | 487 | 7.9 | 71 | 48 | 1.48 |
| 4a | 72.0 | 20.4 | 475 | 13.5 | 65 | 41 | 1.59 |
| 4b | 71.7 | 17.1 | 481 | 5.3 | 65 | 40 | 1.63 |
| 5a | 58.4 | 33.7 | 478 | 9.0 | 52 | 31 | 1.68 |
| 5b | 58.7 | 30.3 | 490 | 2.2 | 53 | 31 | 1.71 |
| 6a | 47.7 | 43.7 | 478 | 8.9 | 43 | 24 | 1.79 |
| 6b | 47.9 | 39.6 | 486 | 2.5 | 43 | 24 | 1.79 |
| 7a | 71.5 | 9.2 | 486 | 10.9 | 64 | 30 | 2.13 |
| 7b | 70.2 | 8.0 | 494 | 4.7 | 63 | 29 | 2.17 |
| 8a | 70.6 | 10.9 | 478 | 23.0 | 64 | 28 | 2.29 |
| 8b | 67.6 | 7.7 | 483 | 7.7 | 61 | 25 | 2.44 |
| 9/1a | 67.5 | 13.3 | 477 | 32.0 | 61 | 23 | 2.65 |
| 9/1b | 64.7 | 8.9 | 481 | 14.8 | 58 | 21 | 2.76 |
| 9/2a | 67.1 | 13.0 | 477 | 37.6 | 60 | 24 | 2.50 |
| 9/2b | 64.0 | 13.0 | 485 | 16.3 | 58 | 23 | 2.52 |
| 9/3a | 70.8 | 10.3 | 477 | 38.8 | 64 | 26 | 2.46 |
| 9/3b | 66.7 | 7.1 | 481 | 18.8 | 62 | 25 | 2.48 |
| 10a | 73.7 | 10.4 | 473 | 51.8 | 66 | 35 | 1.89 |
| 10b | 67.0 | 11.1 | 489 | 18.2 | 61 | 33 | 1.85 |

What is claimed is:

1. A coated substrate, comprising:

a substrate;

a stack of coating layers provided on the substrate comprised of, in the sequence recited:

(i) a first layer of dielectric material which is a composite layer including a sub-layer comprising a selectively absorbent material having a refractive index of at least 1.4, a spectral absorption index $k_\lambda$ of at least 0.4 in the range 380<λ<450 nm and having a ratio of $k_{380<\lambda<450\ nm}/k_{650<\lambda<760\ nm} > 2$, (ii) a first layer of metal selected the group consisting of silver, gold, copper and alloys of one or more thereof, and (iii) a second layer of dielectric material.

2. The coated substrate as claimed in claim 1, wherein the stack includes (iv) a second layer of metal and (v) a third dielectric layer.

3. The coated substrate as claimed in claim 2, wherein the coated substrate has two metal layers, the first layer of metal and the second layer of metal, and wherein the two layers has respective thicknesses ranging from 10 to 25 nm.

4. The coated substrate as claimed in claim 3, wherein the coated substrate has a luminous reflectance (RL) value of less than 15%.

5. The coated substrate as claimed in claim 2, wherein the coated substrate has two metal layers, the first layer of metal and the second layer of metal, wherein the first dielectric layer has a thickness ranging from 15–35 nm, wherein the second dielectric layer has a thickness ranging from 60–90 nm, and wherein the third dielectric layer has a thickness ranging from 20–40 nm.

6. The coated substrate as claimed in claim 2, which forms part of an optical filter.

7. The coated substrate as claimed in claim 6, wherein the first dielectric layer and the third dielectric layer respectively have a thickness which is less than 10 nm, excluding any selective absorbent sub-layer, and wherein the second dielectric layer has a thickness which is (550 nm/4n)±15%, where n represents the refractive index of the second dielectric layer.

8. The coated substrate as claimed in claim 1, wherein the stack further comprises a sacrificial barrier layer provided immediately above the first layer of metal and each layer of metal.

9. The coated substrate as claimed in claim 8, wherein the sacrificial barrier layer has a thickness ranging from 2 to 5 nm.

10. The coated substrate as claimed in claim 8, wherein the sacrificial barrier layer is a layer of titanium metal which is substantially completely oxidized in the finished stack of coating layers.

11. The coated substrate as claimed in claim 1, wherein the first dielectric layer and the second dielectric layer respectively comprise a material selected from the group consisting of at least one metal oxide, at least one metal nitride, and at least one metal sulfide.

12. The coated substrate as claimed in claim 11, wherein the first dielectric layer and the second dielectric layer respectively comprise a material selected from the group consisting of at least one of alumina, aluminum oxynitride, magnesia, niobium oxide, silica, silicon nitride, tantalum oxide, tin oxide, titanium dioxide, yttrium oxide, zinc oxide and zinc sulfide.

13. The coated substrate as claimed in claim 1, wherein the selectively absorbent material of the sub-layer is selected from the group consisting of stainless steel oxide, ferric oxide, a chromium oxide, palladium oxide and zirconia.

14. The coated substrate as claimed in claim 1, wherein the sub-layer comprising a selectively absorbent material has a thickness which is less than 15 nm.

15. The coated substrate as claimed in claim 14, wherein the sub-layer comprising a selectively absorbent material has a thickness which is less than 5 nm.

16. The coated substrate as claimed in claim 1, wherein the coated substrate has a single metal layer which is the first layer of metal, wherein the first dielectric layer has a thickness ranging from 25–45 nm, and wherein the second dielectric layer has a thickness ranging from 35–55 nm.

17. The coated substrate as claimed in claim 1, wherein the coated substrate has a single metal layer which is the first layer of metal, and wherein the single metal layer has a thickness ranging from 10 to 20 nm.

18. The coated substrate as claimed in claim 17, wherein the coated substrate has a luminous reflectance (RL) value of less than 20%.

19. The coated substrate as claimed in claim 1, wherein the coated substrate has a single metal layer which is the first layer of metal, and wherein the single metal layer has a thickness ranging from more than 20 nm up to 30 nm.

20. The coated substrate as claimed in claim 19, wherein the coated substrate has a luminous reflectance (RL) value of less than 40%.

21. The coated substrate as claimed in claim 1, which forms part of an optical filter.

22. The coated substrate as claimed in claim 1, wherein the coated substrate has a color purity (p) of less than 20%.

23. The coated substrate as claimed in claim 1, wherein the coated substrate has a color purity (p) of less than 10%.

24. The coated substrate as claimed in claim 1, wherein the coated substrate has a dominant wavelength ranging from 480 to 500 nm.

25. The coated substrate as claimed in any claim 1, which forms part of a glazing panel.

26. A double glazing panel including a coated substrate as claimed in claim 1.

27. A double glazing panel as claimed in claim 26, wherein the double glazing panel has a selectivity of greater than 1.4.

* * * * *